Dec. 14, 1965     KIYOSHI INOUE     3,223,610

APPARATUS FOR MACHINING HORIZONTAL WORK SURFACES

Filed Sept. 21, 1962

KIYOSHI INOUE
*INVENTOR.*

BY *Karl F. Ross*

AGENT

United States Patent Office 3,223,610
Patented Dec. 14, 1965

3,223,610
APPARATUS FOR MACHINING HORIZONTAL
WORK SURFACES
Kiyoshi Inoue, 182 3-chome Tamagawayoga, Setagaya-ku, Tokyo, Japan
Filed Sept. 21, 1962, Ser. No. 225,300
14 Claims. (Cl. 204—224)

This application is a continuation-in-part of my copending application Ser. No. 13,615, filed Mar. 8, 1960, now abandoned.

The present invention relates to an apparatus for machining and polishing substantially horizontal surfaces of work pieces in the manufacture of dies, gauges or the like.

The machining of such work pieces by mechanical cutting or grinding tools is well known per se, as is the use of electrolytic erosion for the same purpose. A combination of both techniques has, however, not yet been found feasible except in the case of certain grinding devices which are not suitable for the machining of extensive horizontal surfaces.

One difficulty encountered in the attempt to combine mechanical and electrolytic surfacing means arises from the fact that the mechanical machining, especially with a chip-removing cutting tool, proceeds at a much faster rate than the evening of a surface so machined by electrolytic erosion. The general object of this invention is to provide an apparatus which overcomes this difficulty and enables a combined mechanical and electrolytic machining and polishing process to be carried out rapidly and accurately to close tolerances.

Another problem militating against successful joint utilization of mechanical and electrolytic surfacing means is the erosive action which the electrolyte exerts not only upon the work piece but also upon the cutting tool in contact therewith. Another object of my invention, therefore, is to provide means in an apparatus of this type for minimizing the risk of such electrolytic attack upon a machining tool.

In accordance with a feature of this invention I provide, in juxtaposition on a common mounting, a mechanical machining tool and an electrolytic finishing device aligned in the direction of reciprocation of their mounting relative to the work-piece support. During such reciprocation, in the course of which the machining tool alternately precedes and follows the electrolytic device, the work piece and the tool are also relatively shifted in transverse direction, as is well known per se, by a distance which amounts between successive traverses to not more than the effective width of the machining tool and is usually a fraction of that width. The electrolytic polishing device, on the other hand, is provided with a sleeve which contacts the machined work surface to form an electrolyte chamber above it and spans this surface over a width which is considerably larger than the aforementioned distance of transverse shift so that during each traverse the electrolyte within the sleeve wets at least the strip of work surface machined during the preceding traverse. In practice, it will be desirable to choose the inner width of the sleeve so large that it spans a multiplicity of strips machined during individual traverses whereby each such strip is repeatedly subjected to electrolytic action during successive reciprocations of the tool carrier and the desired speedup of the entire operation is facilitated.

Advantageously, in accordance with another feature of this invention, the machining tool is surrounded by a shield which also contacts the work surface and, like the sleeve of the electrolytic device, is of resilient and preferably nonconductive material such as rubber, to impede the access of the electrolyte to the machining tool. The interior of this shield may also be used as a receptacle for a cutting, lubricating and/or cooling fluid which, if used, should be of an essentially nonoily character (although an oil emulsion in aqueous medium could also be used) so as to preclude the formation of a hydrophobic film on the work surface which would inhibit the electrolytic polishing action. This fluid, which also serves to flush away the machining detritus, could be a liquid such as a glycol which is water-soluble but not electrolytic in character so as to protect the tool from exposure to any residual electrolyte in its path; with tools that are highly resistant to anodic decomposition, such as those made of tungsten carbide or stainless steel, the rinsing fluid for the machining tool and the electrolyte for the polishing device could also be the same liquid.

The invention will be described in greater detail hereafter, reference being made to the accompanying drawing in which.

Figure 1:
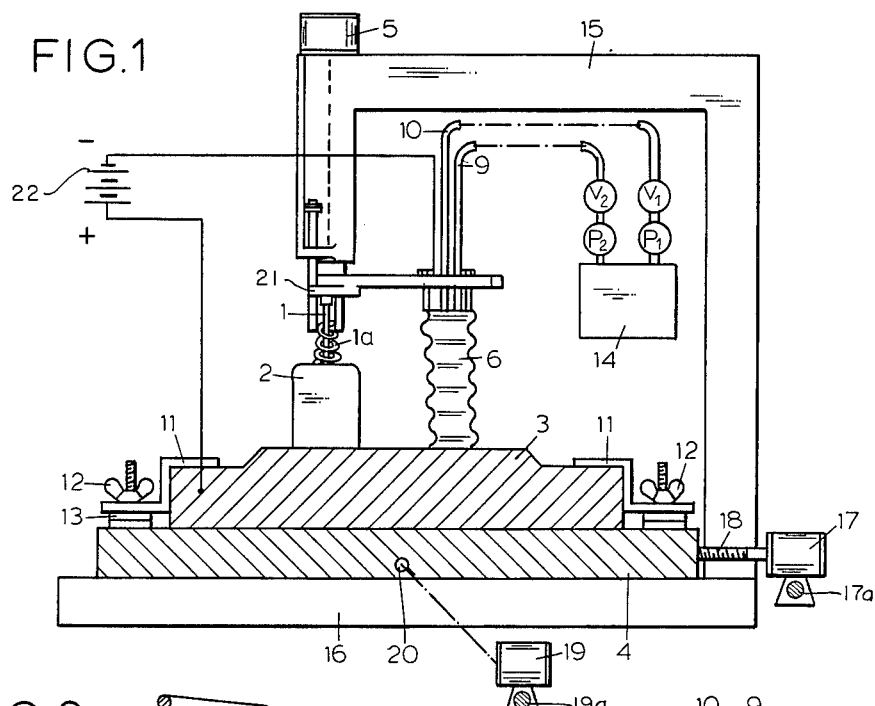
FIG. 1 is a somewhat diagrammatic side-elevational view, partly in section, of an apparatus according to this invention including a machining tool and an electrolytic polisher.
Figure 2:
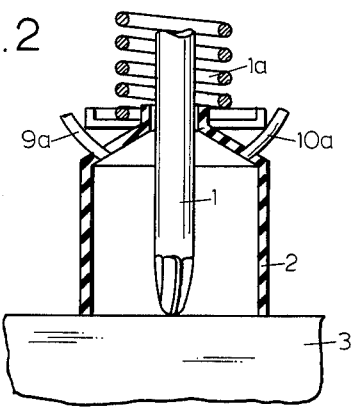
FIG. 2 is a sectional elevation, drawn to a larger scale, of the machining tool of the apparatus shown in FIG. 1.

The apparatus shown in the drawing comprises a standard 15 rising from a base 16. The standard 15 rotatably supports a cutting tool 1 which is driven by an electromotor 5 and is mounted for vertical adjustment at 21 relative to the upper surface of a work piece 3 resting on a body 4. A pair of lead screws 18 and 20, respectively driven by two electric motors 17 and 19, serve to displace the body 4 with reference to the tool mount 15 in two orthogonally related directions. Motor 17 reversibly operates to reciprocate the body 4 in a direction parallel to lead screw 18 whereas motor 19 shifts the body 4 transversely to that direction at a comparatively slow rate so that its displacement in the direction of lead screw 20 is but a fraction of the effective width of tool 1 during each longitudinal traverse of the body. Motor 17 further has its base journalled for free sliding movement on a rod 17a. Motor 19 further has its base journalled on a rod 19a for free sliding movement. Rods 17a and 19a are mounted with their axes parallel respectively to lead screws 20 and 18 in a manner well known in the machine tool art.

An electrolytic polishing device, offset from the tool 1 in the direction of its longitudinal reciprocation, comprises a generally bell-shaped outer sleeve 6 and an inner sleeve 7 respectively communicating with a pair of flexible conduits 9, 10 for the admission and the withdrawal of electrolyte 8 into and from the interior of sleeve 6. This sleeve, which is here shown integral with sleeve 7 and is advantageously made of rubber, thus forms an electrolyte chamber above the surface of work piece 3 which it contacts along its own circular periphery. An electrode 6a within this chamber, surrounding the inner sleeve 7, is connected to the negative terminal of a source 22 of direct current here shown schematically as a battery. The positive terminal of source 22 is shown connected directly to the work piece 3 although it will be understood that a separate anode, e.g. of carbon, might be provided instead within the sleeve 6 in spaced relationship with work piece 3 and electrode 6a.

The conduits 9 and 10 form part of a fluid-circulating system for the electrolyte 8 which includes a storage tank 14, a pump $P_1$ for returning withdrawn liquid from sleeve 6 to the tank by way of a valve $V_1$, and a pump $P_2$ for readmitting the contents of the tank to the interior of sleeve 6 via a valve $V_2$. The flow of the liquid has been indicated by arrows in FIG. 3. It will be understood that filtering and/or precipitating areas may be used in the circuit to free the electrolyte from impurities and metal ions.

Figure 3:
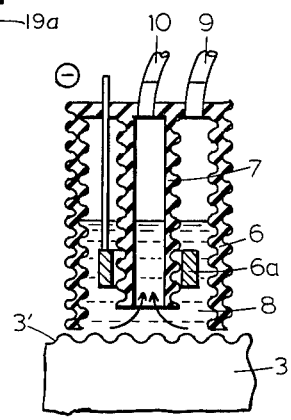
FIG. 3 is a view similar to FIG. 2 of the electrolytic polisher of FIG. 1.

A generally bell-shaped shield 2, preferably also of rubber, spacedly surrounds the tool 1 and bears upon the surface of work piece 3 which is clamped onto the body 4 by brackets 11, wing nuts 12 and lock washers 13. Shield 2, which is vertically displaceable relatively to tool 1, is urged downwardly against the work surface by a compression spring 1a surrounding the tool shaft. Shield 2 may also be provided, as shown in FIG. 3, with flexible conduits 9a and 10a for the admission and the withdrawal of a cutting, lubricating and/or cooling fluid as previously described.

Figure 4:
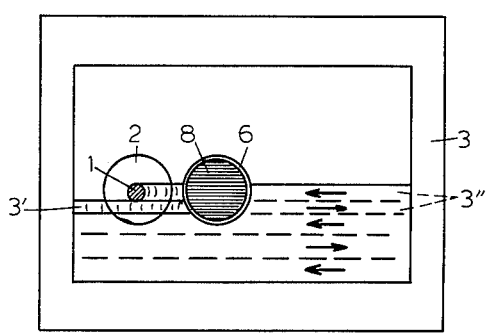
FIG. 4 is a somewhat diagrammatic top view of the work piece machined by the tool and the polisher of FIGS. 1–3.

The rough machining of the work surface by the tool 1 results in the formation of minute grooves 3' (FIGS. 3 and 4) which are subsequently leveled by the electrolyte 8 to provide a successive rough and finish machining. To this end, it is necessary that the electrolyte be allowed to contact the surface of work piece 3 at least once and preferably a number of times after the tool 1 has passed over it. FIG. 4 illustrates at 3'' the longitudinal strips on the surface of work piece 3 which are successively machined during respective traverses of the tool 1, the direction of reciprocation being indicated by the arrows in that figure. Although for convenience of illustration these strips have been given a width substantially equaling that of the tool 1, it will be understood that in practice the strips will be much narrower (corresponding to the advance of bed 4 in the direction of lead screw 20 between consecutive traverses) and may have a width of the same order as that of the grooves 3' in FIG. 3. In the position of FIG. 4, the electrolyte 8 is shown to even the grooves 3' produced by the tool 1 during the instant traverse and also those of the preceding traverse during which the tool 1 had followed the electrolytic device 6 so that leveling could not occur. It will thus be apparent that the device 6 makes at least one pass and generally a multiplicity of passes along each of the strips 3'' roughened by the tool 1.

In the machining of raised surfaces, as illustrated in FIG. 1, both the tool 1 and the electrolyte container 6 may sweep completely across the surface to impart the desired finish and tolerances to it. As the sleeve 6 moves past one of the edges of the work piece, the electrolyte supply may be turned off at valve $V_2$ either manually or automatically.

The apparatus herein disclosed has been found effective to level work pieces of tool steel and other materials from an unevenness of about 20–50μ (e.g. as represented by the peaks of the grooves in FIG. 3) to a final deviation of not more than 2–4μ from a perfectly planar surface. At the same time, the speed of machining is considerably greater than that realizable with conventional apparatus and may in fact be as high as twice the usual rate.

If the electrolyte 8 is a saturated aqueous solution of sodium chloride, the voltage applied across electrode 6a and work piece 3 need only be about 4–10 v. Current densities of the order of 100–500 A./cm.$^2$ have been found adequate. The supply voltage and/or the current density may, of course, be adjusted as needed to produce a desired leveling effect commensurate with changes in cutting pressure and other operating parameters prevailing at the machining tool 1.

It will be understood that the unidirectional current supplied by the source 22 need not be a direct current but could also be of the raw-rectified type. These and other modifications of the system described and illustrated will be readily apparent to persons skilled in the art and are intended to be embraced in the spirit and scope of the invention as defined in the appended claims.

I claim:

1. An apparatus for successively rough and finish machining a substantially horizontal surface of a work piece, comprising support means for holding said work piece, a mounting means, a machining tool of the mechanical cutting type rotatably carried by said mounting means above said surface for engagement with said work piece, said machining tool having a predetermined effective cutting width, an electrolytic finishing device held by said mounting means adjacent said tool above said surface for contact with said work piece, and feed means for relatively displacing said support means and said mounting means in a succession of reciprocating traverses in a common linear path between said tool and said device and with a relative transverse staggering of successive traverses by a distance equal at most to said effective width of said tool whereby a continuous area of said surface can be machined; said device including a flexible sleeve positioned to bear upon said surface while forming an electrolyte chamber thereabove, electrolyte-circulation means connected with the interior of said sleeve, electrode means in said interior and a source of unidirectional current connectable to said electrode means, the inner width of said sleeve exceeding said distance sufficiently to span during each traverse at least the portion of said surface machined during the preceding traverse whereby said machined portion is subjected to the erosive action of the electrolyte in said chamber.

2. An apparatus for successively rough and finish machining a substantially horizontal surface of a work piece, comprising support means for holding said work piece, a mounting means, a machining tool of the mechanical cutting type rotatably carried by said mounting means above said surface for engagement with said work piece, said machining tool having a predetermined effective cutting width, an electrolytic finishing device held by said mounting means adjacent said tool above said surface for contact with said work piece, and feed means for relatively displacing said support means and said mounting means in a succession of reciprocating traverses in a common linear path between said tool and said device and with a relative transverse staggering of successive traverses by a distance equal at most to said effective width of said tool whereby a continuous area of said surface can be machined; said device including a flexible sleeve positioned to bear upon said surface while forming an electrolyte chamber thereabove, electrolyte-circulation means connected with the interior of said sleeve, electrode means in said interior and a source of unidirectional current connectable to said electrode means; said tool being provided with a surrounding flexible shield of corrosion-resisting material positioned to bear upon said surface at a location spaced from said sleeve.

3. An apparatus for successively rough and finish machining a substantially horizontal surface of a work piece, comprising support means for holding said work piece, a mounting means, a machining tool of the mechanical cutting type rotatably carried by said mounting means above said surface for engagement with said work piece, said machining tool having a predetermined effective cutting width, an electrolytic finishing device held by said mounting means adjacent said tool above said surface for contact with said work piece, and feed means for relatively displacing said support means and said mounting means in a succession of reciprocating traverses in a common linear path between said tool and said device and with a relative transverse staggering of successive traverses by a distance equal at most to said effective width of said tool whereby a continuous area of said surface can be machined; said device including a flexible sleeve positioned to bear upon said surface while forming an electrolyte chamber thereabove, electrolyte-circulation means connected with the interior of said sleeve, electrode means in said interior and a source of unidirectional current connectable to said electrode means, the inner width of said sleeve exceeding said distance sufficiently to span during each traverse at least the portion of said surface machined during the preceding traverse whereby said machined portion is subjected to the erosive action of the electrolyte in said chamber; said tool being provided with a surrounding flexible shield of corrosion-resisting material positioned to bear upon said surface at a location spaced from said sleeve.

4. An apparatus for successively rough and finish machining a substantially horizontal surface of a work piece, comprising support means for holding said work piece, a mounting means, a machining tool of the mechanical cutting type rotatably carried by said mounting means above said surface for engagement with said work piece, said machining tool having a predetermined effective cutting width, an electrolytic finishing device held by said mounting means adjacent said tool above said surface for contact with said work piece, and feed means for relatively displacing said support means and said mounting means in a succession of reciprocating traverses in a common linear path between said tool and said device and with a relative transverse staggering of successive traverses by a distance equal at most to said effective width of said tool whereby a continuous area of said surface can be machined; said device including a flexible sleeve positioned to bear upon said surface while forming an electrolyte chamber thereabove, electrolyte-circulation means connected with the interior of said sleeve, a negative electrode in said interior and a source of unidirectional current connectable across said electrode and said work piece; said tool being provided with a surrounding flexible shield of corrosion-resisting material positioned to bear upon said surface at a location spaced from said sleeve.

5. An apparatus for successively rough and finish machining a substantially horizontal surface of a work piece, comprising support means for holding said work piece, a mounting means, a machining tool of the mechanical cutting type rotatably carried by said mounting means above said surface for engagement with said work piece, said machining tool having a predetermined effective cutting width, an electrolytic finishing device held by said mounting means adjacent said tool above said surface for contact with said work piece, and feed means for relatively displacing said support means and said mounting means in a succession of reciprocating traverses in a common linear path between said tool and said device and with a relative transverse staggering of successive traverses by a distance equal at most to said effective width of said tool whereby a continuous area of said surface can be machined; said device including a flexible sleeve positioned to bear upon said surface while forming an electrolyte chamber thereabove, electrolyte-circulation means connected with the interior of said sleeve, a negative electrode in said interior and a source of unidirectional current connectable across said electrode and said work piece, the inner width of said sleeve exceeding said distance sufficiently to span during each traverse at least the portion of said surface machined during the preceding traverse whereby said machined portion is subjected to the erosive action of the electrolyte in said chamber; said tool being provided with a surrounding flexible shield of corrosion-resisting material positioned to bear upon surface at a location spaced from said sleeve.

6. An apparatus according to claim 5 wherein said sleeve and said shield consist of rubber.

7. An apparatus according to claim 5 wherein said shield is vertically displaceable relatively to said tool, further comprising spring means on said mounting means bearing upon said shield for urging it downwardly onto said surface.

8. An apparatus for successively rough and finish machining a substantially planar surface on a conductive workpiece comprising support means for holding said workpiece, a machining tool of the mechanical cutting type for removing material from said surface with a predetermined cutting width, an electrode tool for removing material from said surface across an electrolyte filled gap, a source of electrical potential connected across said electrode tool and said workpiece, means operatively connected to said electrode tool for defining an area of erosion on said workpiece surface of a width at least equal to the aforesaid cutting width, feed means for providing successive traversing movements in a common linear path between said tools and said workpiece, and means for providing a shifting movement between said workpiece and said tools at the end of each successive traversing movement a distance at most equal to the aforesaid cutting width of said machining tool.

9. The combination as set forth in claim 8 wherein said machining tool and said electrode tool are connected in spaced relationship to a common mounting means and said workpiece is movable relative to said tools by said feed means.

10. The combination as set forth in claim 8 wherein said means for defining said area of erosion comprises a resilient, electrolyte containing member enclosing said electrode tool and having its periphery in slidable sealing contact with the surface of said workpiece being machined.

11. The combination as set forth in claim 10 in which said electrode tool comprises a hollow cylindrical member and a means is operatively connected thereto for circulating electrolyte into said resilient member and through said electrode tool.

12. The combination as set forth in claim 8 wherein a means is operatively connected to said machining tool for enclosing it and the surface of said work being machined and a means is connected thereto for circulating fluid therethrough.

13. The combination as set forth in claim 10 wherein said electrode tool has an essentially planar machining face in juxtaposition to the surface of said workpiece and wherein said planar machining face has extending therefrom a nonconductive element for inhibiting short circuiting.

14. An apparatus for successively rough and finish machining a substantially planar surface on a conductive workpiece comprising support means for holding said workpiece, a mounting means, a machining tool of the mechanical cutting type carried by said mounting means for removing material from said workpiece surface with a predetermined cutting width, an electrode tool held by said mounting means and spaced from said machining tool for removing material from said workpiece surface across an electrolyte filled gap, a source of electrical potential connected across said electrode tool and said workpiece, means operatively connected to said electrode tool for defining an area of erosion on said workpiece at least equal to the aforesaid cutting width, feed means for relatively displacing said support means and said mounting means for providing successive traversing movements in a common linear path between said tools and said workpiece, and means for providing shifting movement between said workpiece and said tools at the end of each successive traversing movement for a distance at most equal to said cutting width of said machining tool.

References Cited by the Examiner

UNITED STATES PATENTS 2,868,705  1/1959  Baier et al. _____ 204—224 X
3,043,766  7/1962  Williams _____ 204—224 X

FOREIGN PATENTS 571,794  9/1945  Great Britain.
870,661  6/1961  Great Britain.

ALLEN B. CURTIS, *Primary Examiner.*

JOHN H. MACK, *Examiner.*